April 7, 1959  M. FREEDMAN ET AL  2,880,636
CUTTING AND WEDGING JACKET REMOVER
Filed March 4, 1947  2 Sheets-Sheet 1
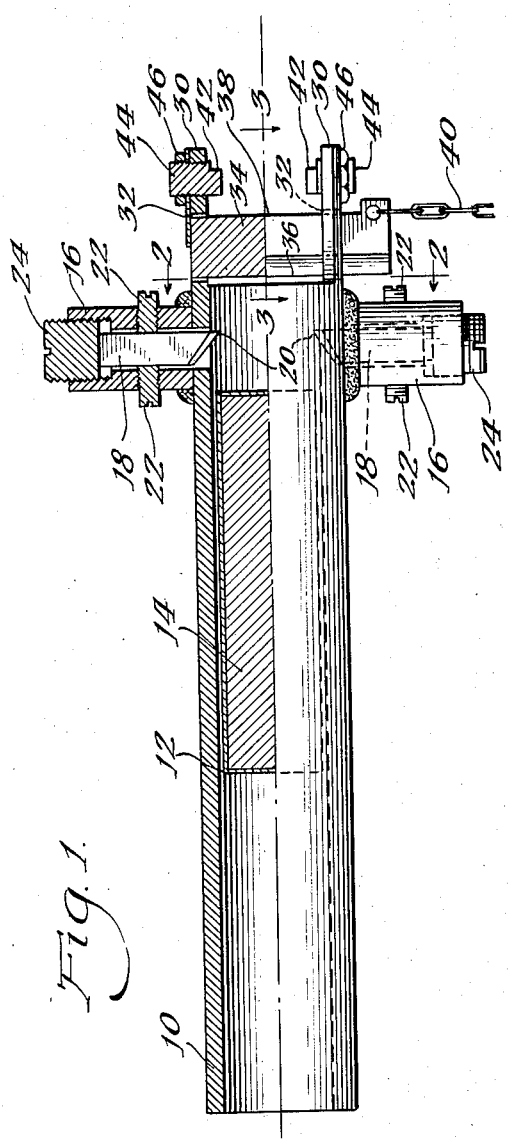
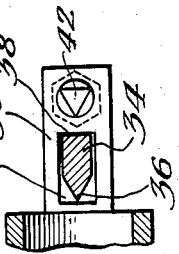
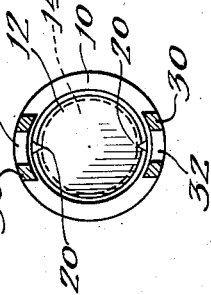
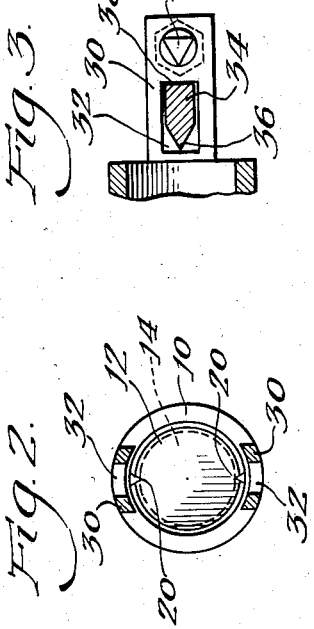
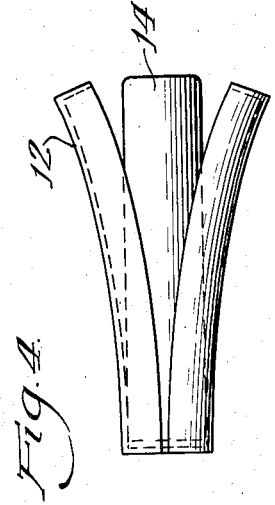
INVENTORS:
Melvin Freedman
Severin Raynor
BY
Robert A. Lavender
Attorney April 7, 1959  M. FREEDMAN ET AL  2,880,636
CUTTING AND WEDGING JACKET REMOVER
Filed March 4, 1947  2 Sheets-Sheet 2

INVENTORS:
Melvin Freedman
Severin Raynor
BY
Robert A. Lavinski
Attorney

2,880,636

CUTTING AND WEDGING JACKET REMOVER

Melvin Freedman and Severin Raynor, Chicago, Ill., assignors to the United States of America as represented by the United States Atomic Energy Commission Application March 4, 1947, Serial No. 732,352

11 Claims. (Cl. 81—9.51)

This invention relates to a tool for stripping jackets from bodies encased therein. More specifically, the invention relates to an improved tool for stripping a closed jacket from an elongated member, for example of metal.

In the construction and operation of certain types of neutronic reactors, it is common to encase the uranium or other fissionable material constituting the fissionable ingredients of the reactor in pressure-tight cans or jackets, commonly of aluminum. Such jackets are described in the co-pending application of Leo Szilard, Eugene P. Wigner and Edward C. Creutz, filed in the United States Patent Office on February 20, 1946, Serial No. 649,080. After such fissionable elements so jacketed are exposed to the neutron flux of the neutronic reactor they are removed from the reactor for processing. They are, of course, highly radioactive as a result of such exposure. It is therefore extremely dangerous for any person to come near such elements.

The principal object of the present invention is to provide a tool for stripping jackets from metallic bodies, adapted to be operated from a position remote from the tool.

It is a further object of the invention to provide a novel combination of cutting members incorporated in a single tool adapted to perform such a stripping operation.

It is a further object of the invention to provide in a single tool a novel combination of cutting members adapted to sever such a jacket with a member which is adapted to strip the jacket from the jacketed body after the severing thereof.

For understanding of the invention, reference is made to the drawing, in which:

Fig. 1 is a plan view, half in section, of a stripping tool embodying the teachings of the invention, together with an illustrative jacketed member to be stripped;

Fig. 2 is a transverse sectional view of the tool of Fig. 1 taken along the line 2—2 thereof;

Fig. 3 is a fragmentary longitudinal sectional view of the tool of Fig. 1 taken along the line 3—3 thereof;

Fig. 4 is a plan view of a jacketed member partially stripped by the tool of Fig. 1, illustrating the operation of the tool;

Figure 5:
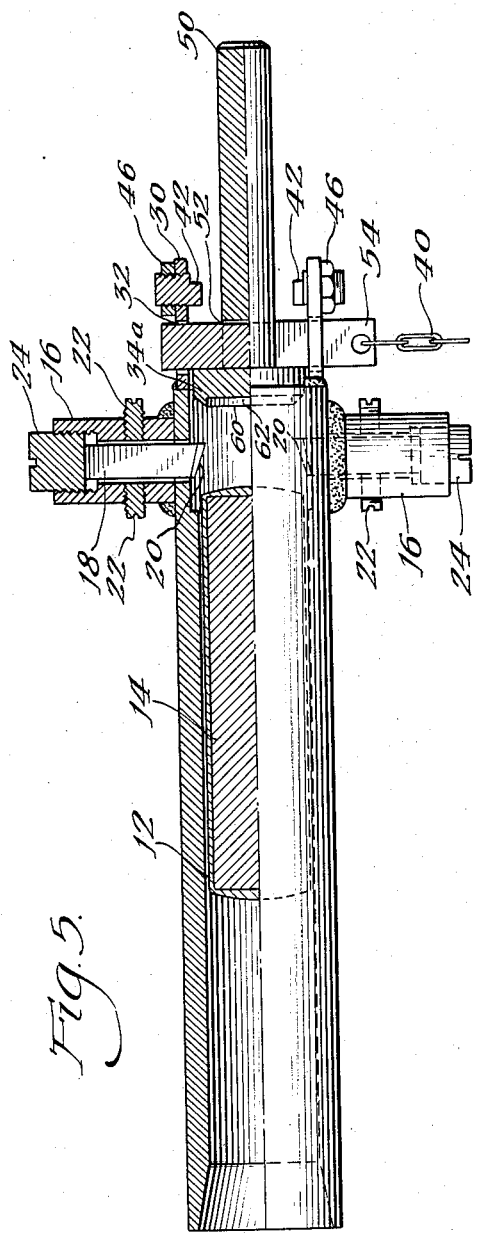
Fig. 5 is a plan view, half in section, of another stripping tool embodying the teachings of the invention together with an illustrative jacketed member to be stripped.

Referring first to Fig. 1, a tube 10, for example an iron pipe, has an inner diameter corresponding closely to the outer diameter of the jacket 12 which covers the jacketed member 14 to be stripped. Side extensions 16 are secured to the tube 10, as by welding, the side extensions 16 having axial apertures (radial of the tube 10) adapted to receive cutting members 18, the cutting edges of which thus protrude radially inward from the walls of the tube 10 and are positioned diametrically opposite each other. The cutting members 18 may be conventional lathe cut-off tools having pointed cutting edges 20. The cutting members 18 are each secured in place by opposed set-screws 22 radial of the side extensions 16. The cutting members 18 are prevented from moving outwardly from the tube 10 by axial set-screws 24 at the outer ends of the side extensions 16. The cutting members 18 are so adjusted that the distance between the opposed sharp edges 20 corresponds to the diameter of the jacketed member 14 excluding the thickness of the jacket 12. Thus when the jacketed member 14 is forced (by conventional means not shown, such as a ram) past the cutting edges 20, longitudinal slits are made in the jacket 12, thus dividing the side walls of the jacket into two sections.

Extending from the exit end of the tube 10 are a pair of tabs 30 constituting partial extensions of the tube 10 as shown more fully in Figs. 2 and 3. The tabs 30 may be made, for example, by merely cutting away the undesired circumferential portions. The tabs 30 are in opposed diametric position corresponding to the diametric opposition of the side extensions 16 and thus the cutting edges 20 of the cutting members 18. Traversing each of the opposed tabs 30 is a substantially rectangular aperture 32 adapted to receive a cutting knife 34 having a straight cutting edge 36 and having a blunt edge 38 opposite the cutting edge 36 and abutting the outer edge of the apertures 32 in the tabs 30. To the cutting tool 34 is attached a chain 40, shown fragmentarily in the drawing, by means of which the cutting knife 34 may be removed from any desired distance by an operator located a long distance away. The straight cutting edge 36 is aligned with the cutting edges 20 of the cutting members 18. Thus, when the jacketed member 14 is forced against the cutting edge 36, the forward end of the jacket 12 is severed along a line intersecting the slits made in the walls of the jacket 12 by the cutting edges 20.

Mounted at the outward ends of the tabs 30 are triangular wedges 42. As illustrated in the drawing, the wedges 42 are machined at the ends of screws 44 which are diametrically opposed and are screwed into the tabs 30 which are tapped to receive them, and locked into position by nuts 46. The wedge edges face inwardly toward the tube 10 and are aligned with the cutting edges 20 and 36. When the cutting tool 34 is removed, the jacketed member 14, which has its walls and forward end severed by the cutting edges 20 and 36, respectively, in the manner described above, is further fed through the tool. The wedges 42 spread the two sections of the jacket 12 so severed, as shown in Fig. 4, until the member 14 is almost entirely past the wedges 42. At this point, the jacketed member 14 falls out of the jacket 12 and the stripping operation is completed.

It may be seen from the above that the whole operation of stripping such a jacketed member is made extremely simple by the novel tool provided by this invention. The device is extremely useful when the jacketed member 14 consists of a radioactive material, such as uranium which has been exposed to neutron irradiation. In such use, the tool illustrated may be placed horizontally in a vise and the jacketed member may be inserted into the tube 10 by remotely controlled mechanical devices which constitute no part of this invention. The sole remaining operations which are then necessary for the operator to perform are ramming the jacketed member 14 through the tube 10 and pulling the chain 40 to remove the tool 34 after the forward end of the jacket 12 has been punctured as above described. These operations may easily be performed by an operator located behind a shielding wall of, for example, lead.

Figure 7:
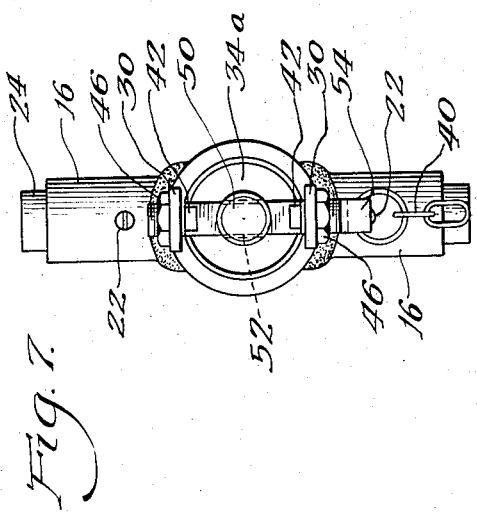
Fig. 7 is an end elevation of the tool of Fig. 5.
Figure 6:
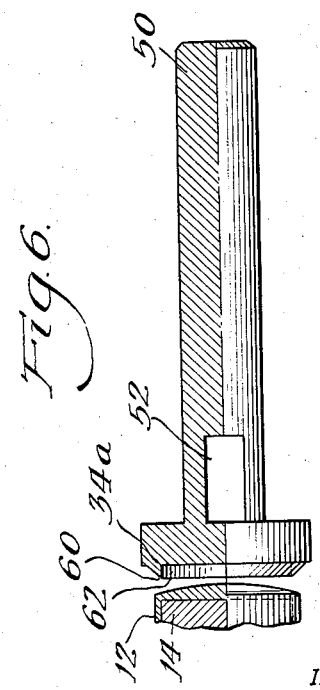
Fig. 6 is a plan view, half in section, of a punch constituting a portion of the tool of Fig. 5, together with a fragmentary portion of the illustrative jacketed member to be stripped.

The tool described above may be operated with great ease and efficiency where the jacket 12 is of rectangular longitudinal cross section, as illustrated in Fig. 1. However, such jackets are sometimes made with longitudinal contours that depart from such rectangularity at the ends thereof. For example, an end may be concave or convex. In such a case, the tool of Fig. 1 may require excessive force to perforate the advance end of the jacket and this may in some cases be altogether impossible without damaging the member within the jacket. For such cases, the modification illustrated in Figs. 5, 6, and 7 may be employed. In these figures the straight cutting knife 34 of the device described above is replaced with a circular punch 34a having an elongated axial handle 50. Through the handle 50 is a transverse aperture 52 of approximately the same dimensions as the apertures 32 in the tabs 30. A rectangular stop 54 traverses the apertures 32 and 52 and holds the punch 34a in position. The punch 34a has a circular cutting edge 60 in the forward end thereof, the cutting edge 60 defining a cup-shaped depression 62. When the forward face of the jacket 12 is forced against the cutting edge 60, the forward face of the jacket 12 is completely severed. The diameter of the cutting edge 60 is preferably the same as the diameter of the jacketed member 14 excluding the thickness of the side walls of the jacket 12. When the stop 54 is removed by means of the chain 40, the punch 34a falls out, taking with it in the depression 62 the front end portion of the jacket 12. The jacketed member 14 may then be forced against the wedges 42 in the manner described above to complete the stripping operation.

The embodiments illustrated in the drawing and described above do not constitute the limits of the teachings of the invention. For example, although the embodiments are adapted for the stripping of cylindrical members, obvious adaptation may be made for members of other cross-sectional contours. Furthermore, although both the embodiments described incorporate two opposed cutting edges 20, it will readily be seen that the device may be built with other numbers of cutting edges 20 placed in various positions. Likewise the tools illustrated for removing or severing the advanced end portion of the jacketed member need not be the straight-edge knife 34 or the punch 34a but any suitable cutter may be used. In both of the embodiments described above, such cutters are removable thus offering the advantage of allowing the member 14 to go all the way through the tool. However, it may be seen that a tool in which such elements are not removable could be used by withdrawing the jacketed member through the entrance end of the tool after splitting of the jacket. The spreading wedges which are provided are of great advantage in simplicity. However, it will readily be seen that other spreading devices, such as for example opposed pivoted hooks, may likewise be used for performing the spreading operation.

In addition to the variants above described, many other devices incorporating the teachings of this invention will readily be constructed by persons skilled in the art. The limits of the invention shall therefore be deemed to be defined only by the claims below.

What is claimed is:

1. A tool for stripping a shell from a cylindrical body comprising, in combination, a member having a cylindrical aperture adapted to receive the shell, two cutting instruments protruding radially inwardly on a diameter of the aperture spaced by a distance approximately equal to the diameter of the cylindrical body, two wedge-shaped members protruding radially inwardly on a diameter of the aperture spaced by a distance approximately equal to the diameter of the cylindrical body and having edges facing toward said two cutting instruments and lying in the same plane therewith, and a removable third cutting instrument, said third cutting instrument having a cutting edge facing longitudinally of the aperture.

2. A tool for stripping a shell from an elongated body comprising, in combination, a member having an aperture adapted to receive the shell, two opposed cutting edges protruding inwardly from the walls of the aperture spaced by a distance approximately equal to the thickness of the elongated body, a removable third cutting edge facing longitudinally of the aperture, the two opposed cutting edges being adapted to slit the shell longitudinally and the third cutting edge being adapted to perforate the end of the shell, and means for spreading the shell spaced longitudinally of the aperture from the said two cutting edges.

3. A tool for stripping a shell from an elongated body comprising, in combination, a member having an aperture adapted to receive the shell, a plurality of fixed cutting edges protruding inwardly from the walls of the aperture adapted to slit the shell longitudinally so as to divide it into peripheral portions, a removable cutting edge facing longitudinally of the aperture and adapted to sever the end of the shell, and means for spreading the peripheral portions of the shell spaced longitudinally of the aperture from the fixed cutting edges.

4. A tool for stripping a shell from an elongated body comprising, in combination, a member having an aperture adapted to receive the shell, a first cutting means within the aperture for slitting the shell into peripheral portions, a second cutting means adapted to perforate the end of the shell so as to free the peripheral portions for spreading, and means for spreading the peripheral portions spaced longitudinally of the aperture from the first cutting means.

5. In a tool for stripping a shell from an elongated body, in combination, a member having an aperture adapted to receive the shell, said aperture having an entrance end and an exit end, means within the aperture for slitting the shell longitudinally, an extension of a portion of the wall of the aperture at the exit end thereof, and a wedge member having a wedge-shaped edge, the wedge member protruding radially inwardly from the extension with said edge facing the exit end of the aperture, so that the wedge member spreads the slit upon emergence of the elongated body from the exit end.

6. In a tool for stripping a shell from an elongated body, in combination, a member having an aperture adapted to receive the shell, said aperture having an exit end, means for slitting the shell longitudinally within said aperture, and a wedge member having a wedge-shaped edge, the wedge member being adjacent the exit end of the aperture with said edge facing the exit end of the aperture and extending radially toward the axis of the aperture, so that the wedge member spreads the slit upon emergence of the elongated body from the exit end.

7. In a tool for stripping a shell from an elongated body, in combination, a member having an aperture through which the shell is adapted to pass, slitting means within said aperture adapted to slit the shell longitudinally upon passage of the shell through the aperture, and a wedge adjacent the exit end of the aperture in alignment with the slitting means and extending radially toward the axis of the aperture, so that the slitted shell is spread by the wedge.

8. In apparatus of the class described, in combination, a member having an aperture adapted to receive an elongated shell, a first cutting means within the aperture for slitting the shell longitudinally, a second cutting means in alignment with the aperture adapted to perforate the end of the shell, and a removable stop member extending through the second cutting means and releasably retaining said second cutting means in position.

9. In apparatus of the class described, in combination, a member having an aperture adapted to receive an elongated shell, two opposed cutting edges protruding inwardly from the walls of the aperture and a removable cutting edge facing longitudinally toward the two cutting edges and having ends in alignment therewith.

10. In apparatus of the class described, in combination, a member having an aperture adapted to receive an elongated shell, a first cutting means within the aperture adapted to slit the shell longitudinally and a second cutting means within the aperture adapted to slit the end of the shell transversely, so that said longitudinal slit intersects said transverse slit.

11. In apparatus of the class described, the combination of claim 10 wherein the second cutting means is removable.

References Cited in the file of this patent
UNITED STATES PATENTS

| | | |
|---|---|---|
| 1,366,082 | Knabe | Jan. 18, 1921 |
| 2,046,341 | McParlin | July 7, 1936 |